United States Patent
Pham

(10) Patent No.: US 10,911,452 B2
(45) Date of Patent: Feb. 2, 2021

(54) SYSTEMS, METHODS, AND MEDIA FOR DETERMINING ACCESS PRIVILEGES

(71) Applicants: Synergex Group, Greenwich, CT (US); Wayne Taylor, Chandler, AZ (US); Pham Holdings, Inc., Lacey, WA (US)

(72) Inventor: Thien Van Pham, Lacey, WA (US)

(73) Assignees: Synergex Group (corp.), Greenwich, CT (US); Pham Holdings, Inc. (corp.), Lacey, WA (US); Wayne Taylor, Chandler, AZ (US)

( * ) Notice: Subject to any disclaimer, the term of this patent is extended or adjusted under 35 U.S.C. 154(b) by 74 days.

(21) Appl. No.: 15/821,008

(22) Filed: Nov. 22, 2017

(65) Prior Publication Data

US 2018/0145985 A1 May 24, 2018

Related U.S. Application Data

(63) Continuation-in-part of application No. 15/359,504, filed on Nov. 22, 2016, now abandoned.

(51) Int. Cl.
*H04L 29/06* (2006.01)

(52) U.S. Cl.
CPC .............. *H04L 63/10* (2013.01); *H04L 63/06* (2013.01); *H04L 63/0861* (2013.01);
(Continued)

(58) Field of Classification Search
CPC ... H04L 63/10; H04L 63/101; H04L 63/0861; H04L 63/06; H04L 63/0815; H04L 63/083; H04L 63/104; H04L 63/0435; H04L 63/12; H04W 12/08; H04W 12/0609; H04W 12/06; H04W 12/04; H04W 2209/80; H04W 12/02; H04W 63/0823;
(Continued)

(56) References Cited

U.S. PATENT DOCUMENTS 9,148,408 B1 *  9/2015  Glazemakers ........ H04L 63/029
9,300,629 B1 *  3/2016  Jahr ........................ H04L 67/02
(Continued)

FOREIGN PATENT DOCUMENTS

EP          2590101          5/2013

OTHER PUBLICATIONS

International Search Report and Written Opinion dated Feb. 23, 2018 in International Patent Application No. PCT/US2017/063023.
(Continued)

*Primary Examiner* — David Garcia Cervetti
(74) *Attorney, Agent, or Firm* — Byrne Poh LLP

(57) ABSTRACT

Systems, methods, and media for determining access privileges are provided. More particularly, in some embodiments, systems for determining access privileges of a user to access a secure node are provided, the systems comprising: a memory; and a hardware processor configured to: receive a username of the user, a secure node identifier of the secure node, a secure node key of the secure node, and a biometric signature sample of the user; validate the secure node identifier and the secure node key; validate the biometric signature sample; and cause the user to gain access to the secure node in response validating the secure node identifier and secure node key and validating the biometric signature sample.

18 Claims, 3 Drawing Sheets

(52) U.S. Cl.
CPC .......... *H04L 63/101* (2013.01); *H04L 63/083* (2013.01); *H04L 63/0815* (2013.01)

(58) Field of Classification Search
CPC ............... H04W 63/062; H04W 21/32; H04W 21/04031; H04W 12/0804; H04W 63/0428; H04W 2209/56; H04W 12/0608; H04W 63/04; H04W 63/0884; G06F 21/577; G06F 21/64; G07C 9/37
See application file for complete search history.

(56) References Cited

U.S. PATENT DOCUMENTS

| | | | | |
|---|---|---|---|---|
| 9,483,682 | B1* | 11/2016 | Chiang | G06F 16/51 |
| 9,813,400 | B2* | 11/2017 | Ross | H04L 63/0815 |
| 9,923,889 | B2* | 3/2018 | Nakajima | H04L 63/083 |
| 9,980,140 | B1 | 5/2018 | Spencer | A61M 5/172 |
| 10,027,657 | B1 | 7/2018 | Vempati | H04L 63/08 |
| 10,200,364 | B1 | 2/2019 | Ketharaju | H04L 63/0861 |
| 10,601,978 | B2* | 3/2020 | Mosher | H04W 12/1206 |
| 2007/0094509 | A1* | 4/2007 | Wei | H04L 9/3231 |
| | | | | 713/176 |
| 2007/0180263 | A1* | 8/2007 | Delgrosso | G06Q 20/4014 |
| | | | | 713/186 |
| 2012/0096530 | A1* | 4/2012 | Hirose | G06F 21/31 |
| | | | | 726/7 |
| 2012/0159600 | A1* | 6/2012 | Takagi | G06K 9/036 |
| | | | | 726/7 |
| 2012/0207393 | A1* | 8/2012 | Huteaux | G06K 9/00174 |
| | | | | 382/186 |
| 2013/0227651 | A1* | 8/2013 | Schultz | H04L 63/0861 |
| | | | | 726/4 |
| 2013/0275195 | A1* | 10/2013 | Gabryelski | G06Q 30/0225 |
| | | | | 705/14.26 |
| 2013/0282589 | A1* | 10/2013 | Shoup | H04L 63/08 |
| | | | | 705/67 |
| 2014/0075510 | A1* | 3/2014 | Sonoda | H04L 63/105 |
| | | | | 726/3 |
| 2014/0173700 | A1* | 6/2014 | Awan | H04L 63/10 |
| | | | | 726/4 |
| 2014/0230033 | A1* | 8/2014 | Duncan | G06F 21/32 |
| | | | | 726/7 |
| 2014/0237553 | A1* | 8/2014 | Feuer | H04L 63/10 |
| | | | | 726/4 |
| 2014/0281567 | A1* | 9/2014 | Rane | G06F 21/32 |
| | | | | 713/186 |
| 2014/0313998 | A1* | 10/2014 | Sorescu | H04M 3/50 |
| | | | | 370/329 |
| 2014/0359746 | A1* | 12/2014 | Tezuka | G06F 21/00 |
| | | | | 726/9 |
| 2015/0089662 | A1* | 3/2015 | Zhang | H04L 67/10 |
| | | | | 726/26 |
| 2015/0103991 | A1* | 4/2015 | Albert | H04M 3/382 |
| | | | | 379/202.01 |
| 2015/0154436 | A1* | 6/2015 | Shi | G06F 21/32 |
| | | | | 382/124 |
| 2015/0188912 | A1 | 7/2015 | Hoyos et al. | |
| 2015/0310444 | A1* | 10/2015 | Chen | G06Q 20/3226 |
| | | | | 705/44 |
| 2016/0030183 | A1 | 2/2016 | Bake et al. | |
| 2016/0042219 | A1* | 2/2016 | Bae | G06K 9/00892 |
| | | | | 382/124 |
| 2016/0086166 | A1* | 3/2016 | Pomeroy | G06Q 20/4018 |
| | | | | 705/40 |
| 2016/0099917 | A1* | 4/2016 | Glazemakers | H04L 63/029 |
| | | | | 726/12 |
| 2016/0125412 | A1* | 5/2016 | Cannon | G06Q 20/4014 |
| | | | | 705/44 |
| 2016/0127343 | A1* | 5/2016 | Schiller | H04L 63/102 |
| | | | | 726/9 |
| 2016/0134599 | A1* | 5/2016 | Ross | G06F 21/41 |
| | | | | 713/168 |
| 2016/0234024 | A1* | 8/2016 | Mozer | H04L 9/3231 |
| 2016/0248752 | A1 | 8/2016 | Blinn | |
| 2016/0269402 | A1* | 9/2016 | Carter | H04L 9/3231 |
| 2016/0292407 | A1* | 10/2016 | Tieu | G06F 21/32 |
| 2017/0041309 | A1* | 2/2017 | Ekambaram | G06F 21/44 |
| 2017/0041314 | A1* | 2/2017 | Shin | H04L 9/085 |
| 2017/0048260 | A1* | 2/2017 | Peddemors | H04L 63/0876 |
| 2017/0055146 | A1* | 2/2017 | Ko | H04W 12/0013 |
| 2017/0064746 | A1* | 3/2017 | Chang | H04N 1/00244 |
| 2017/0171199 | A1* | 6/2017 | Bao | H04L 63/0876 |
| 2017/0244556 | A1* | 8/2017 | Wold | H04W 12/0013 |
| 2017/0244688 | A1* | 8/2017 | Kim | H04L 63/0861 |
| 2017/0272249 | A1* | 9/2017 | Bhandarkar | H04L 9/3247 |
| 2017/0302680 | A1* | 10/2017 | Biswas | H04L 63/105 |
| 2017/0323087 | A1* | 11/2017 | Kline | H04L 9/0869 |
| 2017/0330145 | A1* | 11/2017 | Studnicka | G06Q 10/0832 |
| 2017/0330182 | A1* | 11/2017 | Kohli | G06Q 20/4093 |
| 2017/0331818 | A1* | 11/2017 | Kader | H04L 67/42 |
| 2017/0353444 | A1* | 12/2017 | Karangutkar | H04W 12/0602 |
| 2017/0364675 | A1* | 12/2017 | Vilke | H04L 9/3226 |
| 2017/0372056 | A1* | 12/2017 | Narasimhan | G06F 21/36 |
| 2018/0033013 | A1* | 2/2018 | Park | G06Q 20/325 |
| 2018/0034796 | A1* | 2/2018 | Ross | H04L 63/0442 |
| 2018/0041503 | A1* | 2/2018 | Lindemann | H04L 63/0435 |
| 2018/0068295 | A1* | 3/2018 | Hwang | G06Q 20/3227 |
| 2018/0097787 | A1* | 4/2018 | Murthy | H04L 63/0236 |
| 2018/0097788 | A1* | 4/2018 | Murthy | H04L 63/102 |
| 2018/0097789 | A1* | 4/2018 | Murthy | H04L 63/0227 |
| 2018/0097840 | A1* | 4/2018 | Murthy | H04L 63/02 |
| 2018/0131677 | A1* | 5/2018 | Brickell | H04L 63/061 |
| 2018/0173862 | A1* | 6/2018 | Li | G06F 21/32 |
| 2018/0203986 | A1* | 7/2018 | Huang | G06K 9/00087 |
| 2018/0270067 | A1* | 9/2018 | Woo | H04L 9/32 |
| 2018/0338241 | A1* | 11/2018 | Li | H04L 67/1097 |
| 2019/0012664 | A1* | 1/2019 | Viola | G06F 21/64 |
| 2019/0044943 | A1* | 2/2019 | Kim | H04L 63/0838 |
| 2019/0114861 | A1* | 4/2019 | Durham, III | H04L 63/126 |

OTHER PUBLICATIONS

Office Action dated May 16, 2018 in U.S. Appl. No. 15/359,504.
Extended European Search Report dated May 13, 2020 in EP Patent Application No. 17874347.2, pp. 1-8.

\* cited by examiner

SYSTEMS, METHODS, AND MEDIA FOR DETERMINING ACCESS PRIVILEGES

CROSS REFERENCE TO RELATED APPLICATION

This application is a continuation-in-part of U.S. patent application Ser. No. 15/359,504, filed Nov. 22, 2016, which is hereby incorporated by reference herein in its entirety.

BACKGROUND

Controlling access to computer systems and software is critical to ensuring the security of those systems and software. Typically, access to computer systems and software merely requires that a user enter a user identification (e.g., a username or email address) and a password. However, these credentials are often insecure as a user's email address may be well known to others and passwords can frequently be determined through social engineering, theft, and/or brute force.

Accordingly, more secure mechanisms for controlling access to computer systems and/or software are desirable.

SUMMARY

In accordance with some embodiments, systems, methods, and media for determining access privileges are provided. More particularly, in some embodiments, systems for determining access privileges of a user to access a secure node are provided, the systems comprising: a memory; and a hardware processor configured to: receive a username of the user, a secure node identifier of the secure node, a secure node key of the secure node, and a biometric signature sample of the user; validate the secure node identifier and the secure node key; validate the biometric signature sample; and cause the user to gain access to the secure node in response validating the secure node identifier and secure node key and validating the biometric signature sample.

In some embodiments, methods for determining access privileges of a user to access a secure node are provided, the methods comprising: receiving at a hardware processor a username of the user, a secure node identifier of the secure node, a secure node key of the secure node, and a biometric signature sample of the user; validating the secure node identifier and the secure node key using the hardware processor; validating the biometric signature sample using the hardware processor; and causing the user to gain access to the secure node in response validating the secure node identifier and secure node key and validating the biometric signature sample.

In some embodiments, non-transitory computer-readable media containing computer executable instructions that, when executed by a processor, cause the processor to perform a method for determining access privileges of a user to access a secure node are provided, the method comprising: receiving a username of the user, a secure node identifier of the secure node, a secure node key of the secure node, and a biometric signature sample of the user; validating the secure node identifier and the secure node key; validating the biometric signature sample; and causing the user to gain access to the secure node in response validating the secure node identifier and secure node key and validating the biometric signature sample.

In some embodiments, the systems, the methods, and the method of the non-transitory computer-readable media also receive an IP address corresponding to a device of the user; and determine if the IP address is blocked.

In some embodiments of the systems, the methods, and the method of the non-transitory computer-readable media, the secure node identifier is an App ID.

In some embodiments of the systems, the methods, and the method of the non-transitory computer-readable media, the secure node key is an App Key.

In some embodiments of the systems, the methods, and the method of the non-transitory computer-readable media, validating the secure node identifier and the secure node key comprises determining whether the secure node identifier and the secure node key are stored in a database.

In some embodiments of the systems, the methods, and the method of the non-transitory computer-readable media, validating the biometric signature sample comprises determining whether a percentage of accuracy passes a first threshold.

In some embodiments, the systems, the methods, and the method of the non-transitory computer-readable media also track a number of failed login attempts; determine whether the number of failed log-in attempts passes a second threshold; determine whether the percentage of accuracy fails a third threshold; and block an IP address corresponding to a device of the user when the number of failed log-in attempts passes a second threshold and the percentage of accuracy fails a third threshold.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms, which can include systems, methods, and media, for determining access privileges are provided in accordance with some embodiments. For example, these mechanisms can be used to determine access privileges for accessing a secure node, such as a service, an application, a program, a system, an interface, and/or anything else requiring a secure log-in, in some embodiments. More particularly, for example, in some embodiments, users can use these mechanisms to access software as a service (SaaS) through a Web browser such as Microsoft Internet Explorer, Apple Safari, Mozilla Firefox, and Google Chrome. As another more particular example, in some embodiments, users can use these mechanisms to access an application running on a device.

In some embodiments, when using these mechanisms to access a secure node, a user enters his or her username and clicks a submit button to begin. In some embodiments, the username may be automatically entered or remembered from a previous entry. The username, an IP address of a network router associated with a user's device, an identifier for the secure node (e.g., an App ID), a key for the secure node (e.g., an App Key), and a biometric signature sample are then submitted to a process running on a server (e.g., a single sign-on server). When the process receives the required information, the process validates the information and returns to a response indicating whether access is granted (e.g., successful), temporarily denied (e.g., unsuccessful), or permanently denied (e.g., blacklisted).

Figure 1:
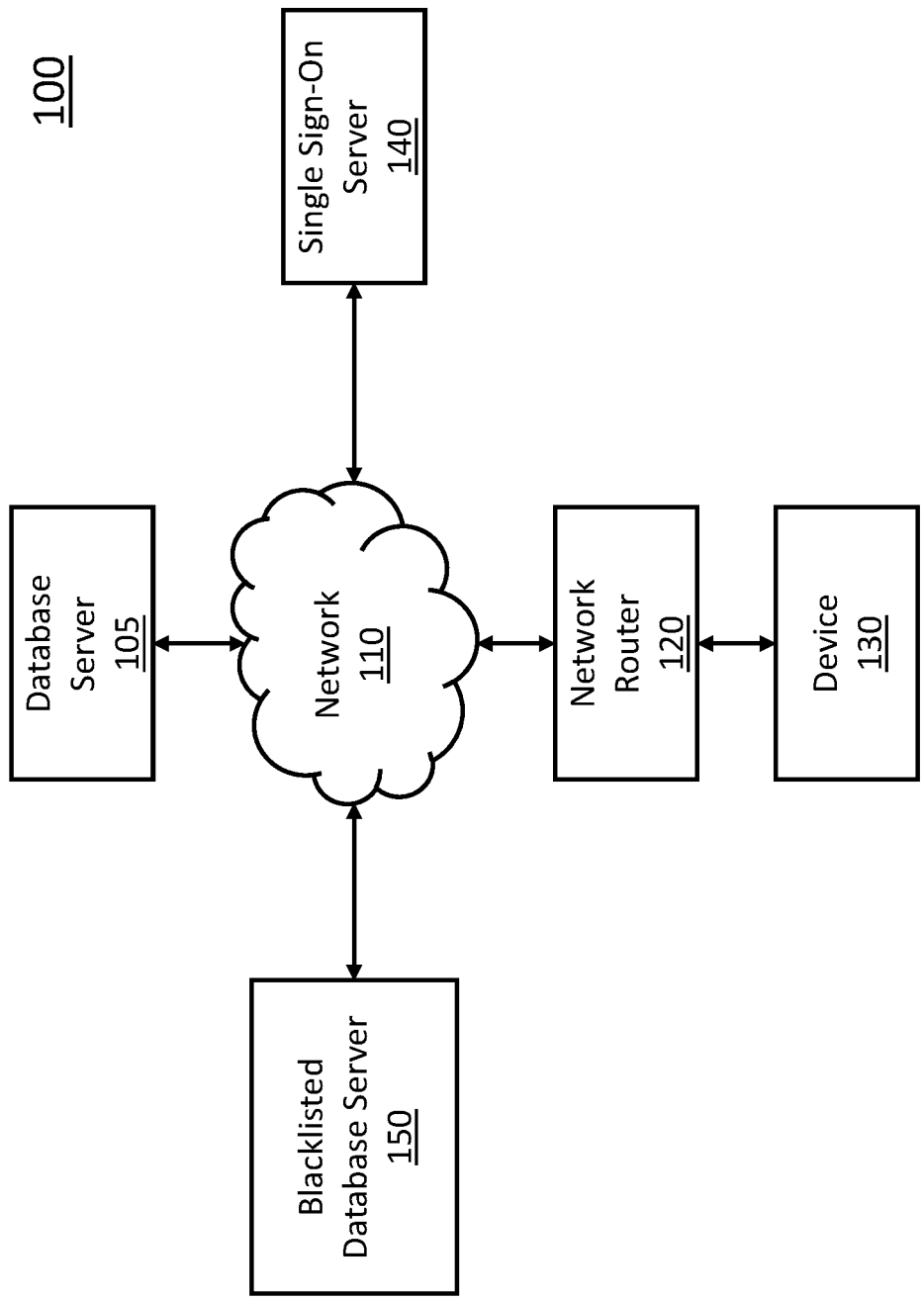
FIG. 1 is a block diagram illustrating an example of a hardware system in which mechanisms for determining access privileges can be implemented in accordance with some embodiments.

FIG. 1 illustrates an example 100 of a system in which the mechanisms described herein can be implemented. As shown, system 100 includes a user device 130, a network router 120, a network 110, a single sign-on server 140, a blacklisted database server 150, and a database server 105.

Although a single user device is shown in FIG. 1, any suitable number of user devices can be used in some embodiments. Although three separate servers are shown in FIG. 1, any suitable number of servers can be used in some embodiments. For example, two or more of the servers shown in FIG. 1 can be combined so that their functions are performed on a single server. Although a single router is shown in FIG. 1, any suitable number of routers (including none) can be used in some embodiments. Although only a single communication network is shown in FIG. 1, any suitable number of communication networks can be used in some embodiments.

Device 130 can be any suitable device from which a user requests access to a secure node, such as a service, an application, a program, a system, an interface, and/or anything else requiring a secure log-in, in some embodiments. For example, in some embodiments, device 130 can be a mobile phone (e.g., a smart phone), a computer (e.g., a laptop computer, a desktop computer, a tablet computer, etc.), a smart appliance (e.g., a smart refrigerator), a vehicle (e.g., car, boat, plane, motorcycle, etc.) navigation, entertainment, or information system, an entertainment system (e.g., a set-top box, a streaming media device, a smart speaker, a television, etc.), a media capture device (e.g., a still image camera, a video camera, an audio recording device, etc.) and/or any other suitable device.

A secure node to which a user of user device 130 is requesting access can be implemented as or on any of the components shown in FIG. 1, or can be implements as or on a component not shown in FIG. 1. For example, in some embodiments, a secure node can be an application running on user device 130. As another example, in some embodiments, a secure node can be a Web site running on a server connected to network 110, but not shown in FIG. 1.

Network router 120 can be any suitable device for connecting one or more devices 130 to one or more networks 110 in some embodiments. Network router can be a wired router and/or a wireless router, in some embodiments. For example, in some embodiments, network router 120 can be a WiFi router.

Network 110 can be any suitable communication network in some embodiments. Network 110 can include any suitable sub-networks, and network 110 and any one or more of the sub-networks can include any suitable connections (e.g., wires, cables, fiber optics, wireless links, etc.) and any suitable equipment (e.g., routers, gateways, switches, firewalls, receivers, transmitters, transceivers, etc.), in some embodiments. For example, network 110 can include the Internet, cable television networks, satellite networks, telephone networks, wired networks, wireless networks, local area networks, wide area networks, Ethernet networks, WiFi networks, mesh networks, and/or any other suitable networks.

Single sign-on server 140 can be any suitable server for validating log-in credentials and allowing access to one or more services, applications, programs, systems, interfaces, and/or anything else requiring a secure log-in in some embodiments.

Blacklisted database server 150 can be any suitable server for tracking what IP addresses have been blacklisted from establishing a secure log-in in some embodiments. In some embodiments, server 150 can maintain data identifying IP addresses that are not allowed to establish a secure log-in and or data identifying IP addresses that are allowed to establish a secure log-in in some embodiments.

Database server 105 can be any suitable server for validating identifiers and keys in some embodiments. For example, in some embodiments, server 105 can list identifiers and keys all services, applications, programs, systems, interfaces, and/or anything else requiring a secure log-in for which access can be granted by the mechanism described herein.

Figure 2:
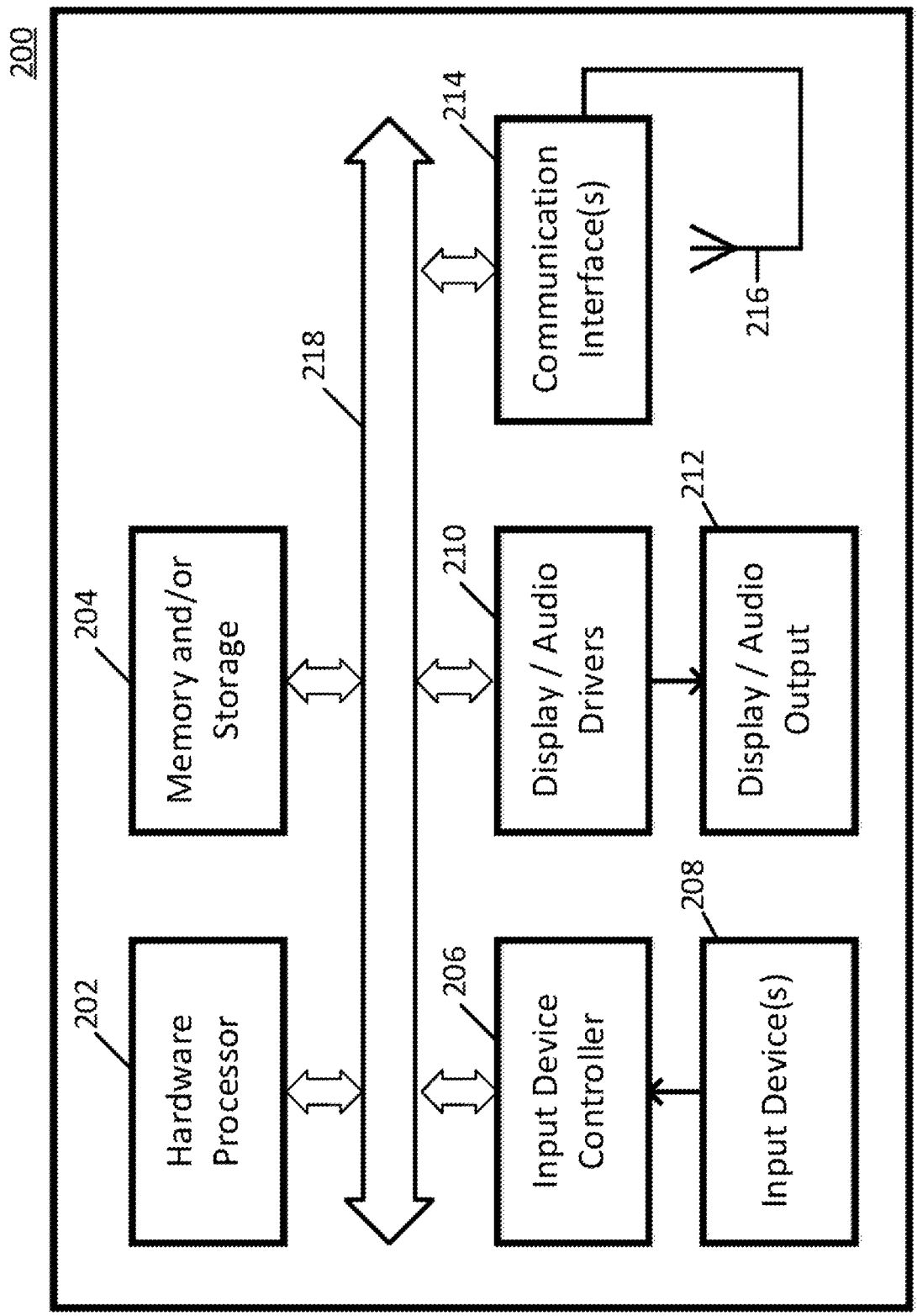
FIG. 2 is a block diagram illustrating an example of hardware that can be used to implement a server, a router, and/or a user device in accordance with some embodiments.

User device 130 and servers 105, 120, 140 and 150 can be implemented using any suitable hardware in some embodiments. For example, in some embodiments, any one or more of user device 130 and servers 105, 120, 140 and 150 can be implemented using any suitable general-purpose computer or special-purpose computer. For example, user device 130 can be implemented using a special-purpose computer, such as a smart phone. Any such general-purpose computer or special-purpose computer can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor(s), dedicated logic, and/or any other suitable circuitry for controlling the functioning of a general-purpose computer or a special-purpose computer in some embodiments.

Memory and/or storage 204 can be any suitable memory and/or storage for storing programs, data, media content, and/or any other suitable information in some embodiments. For example, memory and/or storage 204 can include random-access memory, read-only memory, flash memory, hard disk storage, optical media, and/or any other suitable memory.

Input device controller 206 can be any suitable circuitry for controlling and receiving input from a device, such as input device 208, in some embodiments. For example, input device controller 206 can be circuitry for receiving input from an input device 208, such as a touch screen, from one or more buttons, from a voice recognition circuit, from a microphone, from a camera, from an optical sensor, from an accelerometer, from a temperature sensor, from a near field sensor, and/or any other type of input device.

Display/audio drivers 210 can be any suitable circuitry for controlling and driving output to one or more display/audio output circuitries 212 in some embodiments. For example, display/audio drivers 210 can be circuitry for driving an LCD display, a speaker, an LED, or any other type of output device.

Communication interface(s) 214 can be any suitable circuitry for interfacing with one or more other devices and/or communication networks, such as network 110 as shown in FIG. 1. For example, interface(s) 214 can include network interface card circuitry, wireless communication circuitry, and/or any other suitable type of communication network circuitry.

Antenna 216 can be any suitable one or more antennas for wirelessly communicating with a communication network in some embodiments. In some embodiments, antenna 216 can be omitted when not needed.

Bus 218 can be any suitable mechanism for communicating between two or more components 202, 204, 206, 210, and 214 in some embodiments.

Any other suitable components can be included in hardware 200 in accordance with some embodiments.

Figure 3:
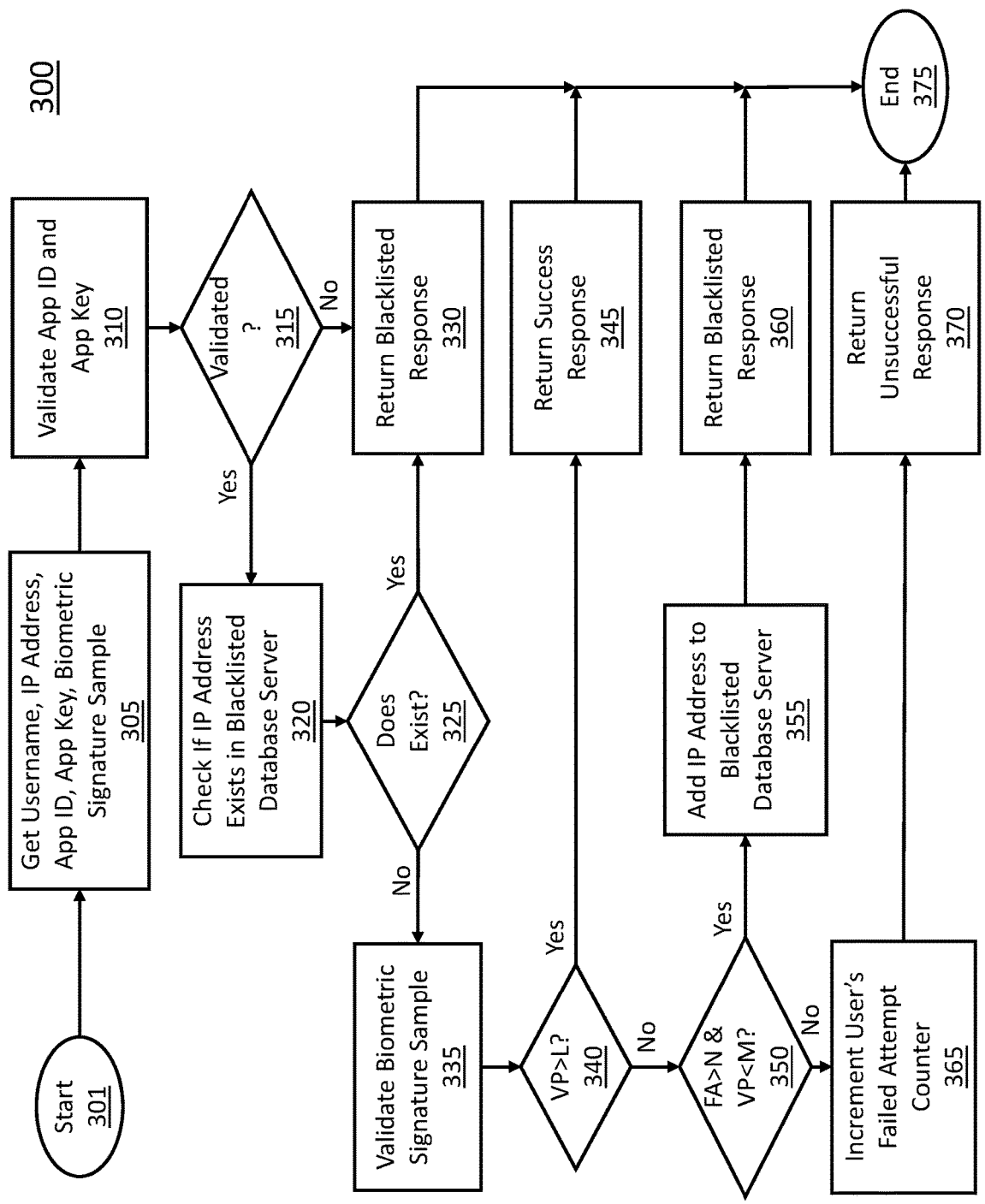
FIG. 3 is a flow diagram illustrating an example of a process for determining access privileges in accordance with some embodiments.

Turning to FIG. 3, an example of a process 300 for determining access privileges that can be implemented on single sign-on server 140 in some embodiments is shown.

As illustrated, in some embodiments, this process can use a username, an IP address, an identifier, a key, and a biometric signature sample to determine whether access privileges to a secure node are to be granted. A username can be any suitable identifier of a user. An IP address can be an Internet Protocol address for a network router to which a user's device is connected. In some embodiments, the IP address can be an IP address of the user's device. An identifier can be an identifier of a secure node, such as a service, an application, a program, a system, an interface, and/or anything else requiring a secure log-in, to which the user is trying to gain access. For example, in some embodiments, an identifier can be an App ID for the secure node. A key is a unique identifier created by a secure node, such as a service, an application, a program, a system, an interface, and/or anything else requiring a secure log-in. For example, in some embodiments, a key can be an App Key for the secure node. A biometric signature sample can be any suitable data based on biometric data of a user (e.g., a fingerprint, a retinal scan, a physical signature of a user, etc.). Although a username, an IP address, an identifier, a key, and a biometric signature sample are described in FIG. 3 as being used to determine whether access privileges are to be granted, any one or more of these pieces of data can be omitted, and/or any other suitable data can be used.

As illustrated in FIG. 3, after process 300 begins at 301, the process receives a username, an IP address, an identifier, a key, and a biometric signature sample at 305. These items can be received from any suitable one or more source in some embodiments. For example, in some embodiments, these items can be received from a user device or from a combination of a user device and a network router.

At 310, process 300 validates the identifier and the key. This validation can be performed in any suitable manner. For example, in some embodiments, process 300 can transmit the identifier and key to database server 105 and receive response either validating the pair or rejecting the pair. As another example, in some embodiments, process 300 can transmit the identifier and receive back a key that can be compared to the key known by process 300 to perform validation.

At 315, process 300 can branch based on whether the identifier and the key have been validated. If it is determined at 315 that the identifier and/or the key have not been validated, process 300 returns a blacklisted response at 330 and then ends at 375. A blacklisted response indicates that access will not be granted.

If at 315 process 300 determines that the identifier and the key have been validated, the process determines if the IP address is blocked. This determination can be made in any suitable manner. For example, in some embodiments, the process can perform this determination by checking if the IP address exists in blacklisted database server 150 at 320. This check can be performed in any suitable manner. For example, in some embodiments, process 300 can transmit the IP address to blacklisted database server 150 and receive a response either indicating whether the IP address is listed. As another example, in some embodiments, process 300 can transmit a portion of the IP address to server 150 and receive back one or more matching IP addresses so that the matching IP addresses can be compared to the IP address known by process 300.

Next, at 325, process 300 can branch based on whether the IP address exists in the blacklisted database server. If it is determined at 325 that the IP address does exist in the blacklisted database server 150, process 300 branches to 330 and proceeds as described above.

If process 300 determines at 325 that the IP address does not exist in the blacklisted database server 150, process 300 validates the biometric signature sample. This can be performed in any suitable manner in some embodiments. For example, the biometric signature sample can be validated using a biometric signature verification program in some embodiments. In some embodiments, the validation returns a percentage of accuracy (VP) of the biometric signature sample to a set of biometric signature samples. In some embodiments, VP is greater than or equal to 0 (e.g., extremely different) and less than or equal to 100 (e.g., extremely similar or identical).

As described above, the biometric signature sample can be any suitable data, such as data based on an image or video of a face, audio of a voice, a finger print, a signature (e.g., drawn by the movement of a computer mouse, finger on a touch screen or digitizer tablet, etc.), in some embodiments.

At 340, process determines whether the percentage of accuracy (VP) passes a threshold (L). Any suitable threshold (L) can be used in some embodiments, and in some embodiments the threshold (L) is greater than or equal to 0 and less than or equal to 100. Although FIG. 3 illustrates determining whether VP is greater than L (VP> L), in some embodiments, VP passing threshold L can be VP being greater than or equal to L. Naturally, in some embodiments, instead of indicating how similar the biometric signature sample is to a set of biometric signature samples, the validation can instead indicate how different the biometric signature sample is from a set of biometric signature samples. For example, the validation can output a VP equal to 10 to indicate extremely different and a VP equal to 0 indicate extremely similar or identical. In such a case, passing a threshold may be indicated when VP is less than or less than or equal to L.

If process 300 determines at 340 that VP passes L, then process 300 can return a success response at 345 and end at 375. This success response can indicate that access is permitted and cause access to be granted. Access can be caused to be granted in any suitable manner. For example, in some embodiments, the user can be provided access to portions of a secure node which were previously blocked to the user.

If process 300 determines at 340 that VP does not pass L, process 300 can determine whether the user's failed attempt counter (FA) passes a threshold N and whether the validation percentage (VP) fails a threshold M. FA can be a count of the user's failed attempts and can be an integer number greater than or equal to zero in some embodiments. Threshold N can be any suitable threshold of the number of failed attempts and can be a number greater than zero in some embodiments. Threshold M can be any suitable threshold for the validation percentage and can be greater than or equal to 0 and less than or equal to 100 greater in some embodiments. In some embodiments, FA passing a threshold N can be FA being greater than N or being greater than or equal to N. In some embodiments, VP failing threshold M can be VP being less than M or being less than or equal to M.

If process 300 determines at 350 that FA passes N and that VP fails M, then the process can add the IP address to the blacklisted database server 150 at 355, return a blacklisted response at 360, and then end at 375.

If process 300 determines at 350 that FA does not pass N or that VP passes M, the process can increment the user's failed attempt counter (FA) at 365, return an unsuccessful response at 370, and end at 375. This unsuccessful response can indicate that access is not yet permitted.

While process 300 is described herein as being performed by single sign-on server 140, this process can be performed by any suitable one or more devices.

Process 300 describes communication between various components. This communication can be performed in any suitable manner in some embodiments. For example, in some embodiments, for each communication, a connection can be established between the components, data transmitted, and the connection broken. As another example, in some embodiments, connections between components can remain established for multiple communication instances.

It should be understood that at least some of the above described blocks of the process of FIG. 3 can be executed or performed in any order or sequence not limited to the order and sequence shown in and described in the figure. Also, some of the above blocks of the process of FIG. 3 can be executed or performed substantially simultaneously where appropriate or in parallel to reduce latency and processing times. Additionally or alternatively, some of the above described blocks of the process of FIG. 3 can be omitted.

In some implementations, any suitable computer readable media can be used for storing instructions for performing the functions and/or processes described herein. For example, in some implementations, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for determining access privileges of a user to access a secure node, comprising:
a memory; and
a hardware processor configured to:
receive a secure node identifier of the secure node, a secure node key of the secure node, and a biometric signature sample of the user;
validate the secure node identifier and the secure node key;
in response to validating the secure node identifier and the secure node key, determine if an IP address associated with the user is blocked;
in response to determining that the IP address associated with the user is not blocked, validate the biometric signature sample, wherein validating the biometric signature sample comprises determining whether a percentage of accuracy of the biometric signature sample passes a first threshold; and
in response to determining that the percentage of accuracy of the biometric signature sample does not pass the first threshold:
track a number of failed log-in attempts;
determine whether the number of failed log-in attempts passes a second threshold;
determine whether the percentage of accuracy of the biometric signature sample fails a third threshold; and
block an IP address corresponding to a device of the user when the number of failed log-in attempts passes the second threshold and the percentage of accuracy of the biometric signature sample fails the third threshold.

2. The system of claim 1, wherein the IP address associated with the user is an IP address corresponding to a device of the user.

3. The system of claim 1, wherein the secure node identifier is an App ID.

4. The system of claim 1, wherein the secure node key is an App Key.

5. The system of claim 1, wherein validating the secure node identifier and the secure node key comprises determining whether the secure node identifier and the secure node key are stored in a database.

6. The system of claim 1, wherein the biometric signature sample of the user is a physical signature of the user.

7. A method for determining access privileges of a user to access a secure node, comprising:
receiving at a hardware processor a secure node identifier of the secure node, a secure node key of the secure node, and a biometric signature sample of the user;
validating the secure node identifier and the secure node key using the hardware processor;
in response to validating the secure node identifier and the secure node key, determining if an IP address associated with the user is blocked;
in response to determining that the IP address associated with the user is not blocked, validating the biometric signature sample using the hardware processor, wherein validating the biometric signature sample comprises determining whether a percentage of accuracy of the biometric signature sample passes a first threshold; and
in response to determining that the percentage of accuracy of the biometric signature sample does not pass the first threshold:

tracking a number of failed log-in attempts;
determining whether the number of failed log-in attempts passes a second threshold;
determining whether the percentage of accuracy of the biometric signature sample fails a third threshold; and
blocking an IP address corresponding to a device of the user when the number of failed log-in attempts passes the second threshold and the percentage of accuracy of the biometric signature sample fails the third threshold.

8. The method of claim 7, wherein the IP address associated with the user is an IP address corresponding to a device of the user.

9. The method of claim 7, wherein the secure node identifier is an App ID.

10. The method of claim 7, wherein the secure node key is an App Key.

11. The method of claim 7, wherein validating the secure node identifier and the secure node key comprises determining whether the secure node identifier and the secure node key are stored in a database.

12. The method of claim 7, wherein the biometric signature sample of the user is a physical signature of the user.

13. A non-transitory computer-readable medium containing computer executable instructions that, when executed by a processor, cause the processor to perform a method for determining access privileges of a user to access a secure node, the method comprising:
receiving a secure node identifier of the secure node, a secure node key of the secure node, and a biometric signature sample of the user, wherein the biometric signature sample of the user is a physical signature of the user;
validating the secure node identifier and the secure node key;
in response to validating the secure node identifier and the secure node key, determining if an IP address associated with the user is blocked;
in response to determining that the IP address associated with the user is not blocked, validating the biometric signature sample, wherein validating the biometric signature sample comprises determining whether a percentage of accuracy of the biometric signature sample passes a first threshold; and
in response to determining that the percentage of accuracy of the biometric signature sample does not pass the first threshold:
tracking a number of failed log-in attempts;
determining whether the number of failed log-in attempts passes a second threshold;
determining whether the percentage of accuracy of the biometric signature sample fails a third threshold; and
blocking an IP address corresponding to a device of the user when the number of failed log-in attempts passes the second threshold and the percentage of accuracy of the biometric signature sample fails the third threshold.

14. The non-transitory computer-readable medium of claim 13, wherein the IP address associated with the user is an IP address corresponding to a device of the user.

15. The non-transitory computer-readable medium of claim 13, wherein the secure node identifier is an App ID.

16. The non-transitory computer-readable medium of claim 13, wherein the secure node key is an App Key.

17. The non-transitory computer-readable medium of claim 13, wherein validating the secure node identifier and the secure node key comprises determining whether the secure node identifier and the secure node key are stored in a database.

18. The non-transitory computer-readable medium of claim 13, wherein the biometric signature sample of the user is a physical signature of the user.

\* \* \* \* \*